(12) United States Patent
Mitsubori et al.

(10) Patent No.: US 7,607,367 B2
(45) Date of Patent: Oct. 27, 2009

(54) SPEED CHANGE CONTROL METHOD FOR TWIN CLUTCH GEAR TRANSMISSION

(75) Inventors: Toshimasa Mitsubori, Saitama (JP); Yoshiaki Tsukada, Saitama (JP); Masahiro Kuroki, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 480 days.

(21) Appl. No.: 11/642,661

(22) Filed: Dec. 21, 2006

(65) Prior Publication Data

US 2007/0144284 A1 Jun. 28, 2007

(30) Foreign Application Priority Data

Dec. 28, 2005 (JP) ............... 2005-377448

(51) Int. Cl.
*F16H 61/688* (2006.01)
(52) U.S. Cl. ............... 74/335; 74/330; 74/340
(58) Field of Classification Search ........... 74/340; 192/3.55, 3.56, 3.61
See application file for complete search history.

(56) References Cited

U.S. PATENT DOCUMENTS 5,890,392 A * 4/1999 Ludanek et al. ............ 74/331
6,095,001 A * 8/2000 Ruehle et al. ............. 74/331
2004/0144190 A1* 7/2004 Hall, III ..................... 74/331

FOREIGN PATENT DOCUMENTS

| DE | 103 08 748 A1 | 12/2003 |
| DE | 103 49 220 A1 | 2/2005 |
| JP | 3598998 B2 | 9/2004 |

* cited by examiner

*Primary Examiner*—Sherry L Estremsky
*Assistant Examiner*—Edwin A Young
(74) *Attorney, Agent, or Firm*—Birch, Stewart, Kolasch & Birch, LLP

(57) ABSTRACT

A twin clutch gear transmission for a vehicle is provided for improving speed change control. The twin clutch gear transmission includes an even-numbered-gear-change gear transmission mechanism having a plurality of even-numbered gear-change gear trains which can be selectively established, and an odd-numbered-gear-change gear transmission mechanism having a plurality of odd-numbered gear-change gear trains which can be selectively established. The pair of clutches are capable of individually changing over the disconnection and the connection of power transmission between input shafts, which both gear transmission mechanisms include respectively, and a power source.

18 Claims, 9 Drawing Sheets

SPEED CHANGE CONTROL METHOD FOR TWIN CLUTCH GEAR TRANSMISSION

CROSS-REFERENCE TO RELATED APPLICATION

The present application claims priority under 35 U.S.C. §119 to Japanese Patent Application No. 2005-377448, filed Dec. 28, 2005, the entire contents of which are hereby incorporated by reference.

BACKGROUND OF THE INVENTION

1. Field of the Invention

The present invention relates to a twin clutch type gear transmission which includes an even-numbered-gear-change gear transmission mechanism which includes a plurality of even-numbered gear-change gear trains which can be selectively established, an odd-numbered-gear-change gear transmission mechanism which includes a plurality of odd-numbered gear-change gear trains which can be selectively established, and a pair of clutches which is capable of individually changing over the disconnection and the connection of power transmission between input shafts which both gear transmission mechanisms include respectively and a power source, and more particularly to an improvement of a speed change control method for such a twin clutch type gear transmission.

2. Description of Background Art

In Japanese Patent No. 3598998, for example, there has been known a twin clutch type gear transmission in which a pair of clutches which individually correspond to first and second gear-change stage groups which are divided in two are brought into a connection state in a usual operation condition, and a desired speed change ratio is obtained by selectively establishing one of a plurality of gear-change gear trains which the first and second gear-change stage groups respectively include.

However, the twin clutch type gear transmission which is disclosed in Japanese Patent No. 3598998, in the usual operation condition, both clutches are brought into the connection state and hence, to establish the gear train for a next gear-change stage at the time of performing the speed-change changeover, it is necessary to disconnect one clutch. In this case, not only the speed-change responsiveness is lowered correspondingly to the disconnection of one clutch but also a friction loss in a usual operation condition is increased and hence, the fuel consumption of an engine is increased and, at the same time, a gear-change shock is large and hence, a rider cannot enjoy comfortable riding attributed to the large gear change shock.

SUMMARY AND OBJECTS OF THE INVENTION

The present invention has been made under such circumstances and it is an object of the present invention to provide a speed-change control method for a twin clutch type gear transmission which can reduce fuel consumption by suppressing a friction loss in a usual operation condition while enhancing the speed change responsiveness and can alleviate a speed change shock.

According to a first aspect of the present invention, a twin clutch type gear transmission which includes an even-numbered-gear-change gear transmission mechanism which includes a plurality of even-numbered gear-change gear trains which can be selectively established; an odd-numbered-gear-change gear transmission mechanism which includes a plurality of odd-numbered gear-change gear trains which can be selectively established; and a pair of clutches which is capable of individually changing over the disconnection and the connection of power transmission between input shafts which both gear transmission mechanisms include respectively and a power source, wherein one of both clutches is brought into a connection state and the other is brought into a disconnection state under a usual operation condition in which a speed change ratio is fixed When performing the changeover of a speed change between the even-numbered gear-change stages or between the odd-numbered-gear-change stages, when one of the even-numbered-gear-change gear transmission mechanism and the odd-numbered-gear-change gear transmission mechanism assumes a neutral state in the midst of the changeover for the establishment of the gear train, the clutch corresponding to the gear transmission mechanism which becomes an object of changeover for the establishment of the gear train out of the even-numbered-gear-change gear transmission mechanism and the odd-numbered-gear-change gear transmission mechanism is changed over to a connection state from a disconnection state. Then, after being disconnected again, the clutch is changed over from a disconnection state to a connection state after completion of the changeover for the establishment of the gear train.

According to a second aspect of the present invention, when one of the even-numbered-gear-change gear transmission mechanism and the odd-numbered-gear-change gear transmission mechanism assumes a neutral state in the midst of the changeover of the establishment of the gear train, a time in which the clutch corresponding to the gear transmission mechanism which becomes an object of the changeover for the establishment of the gear train in a disconnection state is temporarily changed over to a connection state is set to a short time.

According to a third aspect of the present invention, when performing a shift-down operation of a speed change ratio between the even-numbered gear-change stages or between the odd-numbered-gear-change stages, when one of the even-numbered-gear-change gear transmission mechanism and the odd-numbered-gear-change gear transmission mechanism assumes a neutral state in the midst of the changeover of the establishment of the gear train, both clutches are held in a connection state only for a short time and, thereafter, one of both clutches is disconnected, thus establishing a lower gear-change gear train.

According to a fourth aspect of the present invention, when performing a shift-up operation of a speed change ratio between the even-numbered gear-change stages or between the odd-numbered-gear-change stages, when one of the even-numbered-gear-change gear transmission mechanism and the odd-numbered-gear-change gear transmission mechanism assumes a neutral state in the midst of the changeover of the establishment of the gear train, both clutches are held in a connection state only for a short time and, thereafter, one of both clutches is disconnected thus establishing an upper gear-change gear train.

EFFECTS OF THE INVENTION

According to the first and second aspects of the present invention, when, one of both clutches is disconnected in the usual operation condition and hence, it is possible to reduce the fuel consumption by suppressing a friction loss. Further, at the time of changing over the speed change for changing a speed change ratio, it is possible to preliminarily establish the gear train of a next gear-change stage which follows next in the speed change direction in a state that the clutch corresponding to the gear train is disconnected and hence, the speed-change control due to the disconnection/connection control of both clutches can be facilitated and, at the same time, the speed change responsiveness can be enhanced. Still further, a speed change shock at the time of completion of the change over of the establishment of the gear train can be alleviated. That is, in performing the changeover of the speed change between the even-numbered-gear-change stages or between the odd-numbered-gear-change stages, when the clutch which corresponds to the gear transmission mechanism which becomes an object of the changeover for the establishment of the gear train out of the even-numbered-gear-change gear transmission mechanism and the odd-numbered-gear-change gear transmission mechanism is held in the disconnection state, the input shaft of the gear transmission mechanism is rotated at a rotational speed before the changeover of the establishment of the gear train is performed immediately before the completion of the changeover of the establishment of the gear train.

However, when the changeover of the establishment of the gear train is completed, the rotational speed of the input shaft of the gear transmission mechanism is largely changed thus giving rise to a large speed change shock. However, by temporarily bringing the clutch corresponding to the gear transmission mechanism into a connection state when the gear transmission mechanism which is an object of the changeover of the establishment of the gear train assumes a neutral state in the midst of the changeover of the establishment of the gear train, it is possible to change the rotational speed of the input shaft to the rotational speed corresponding to the gear change stage in the midst of the changeover of the speed change and hence, it is possible to alleviate the above-mentioned speed change shock.

According to the third aspect of the present invention, it is possible to alleviate the speed change shock at the time of performing the shift-down between the even-numbered gear change stages or between the odd-numbered gear change stages.

According to the fourth aspect of the present invention, it is possible to alleviate the speed change shock at the time of performing the shift-up between the even-numbered gear change stages or between the odd-numbered gear change stages.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein and the accompanying drawings which are given by way of illustration only, and thus are not limitative of the present invention, and wherein.

DETAILED DESCRIPTION OF THE PREFERRED EMBODIMENT

Figure 1:
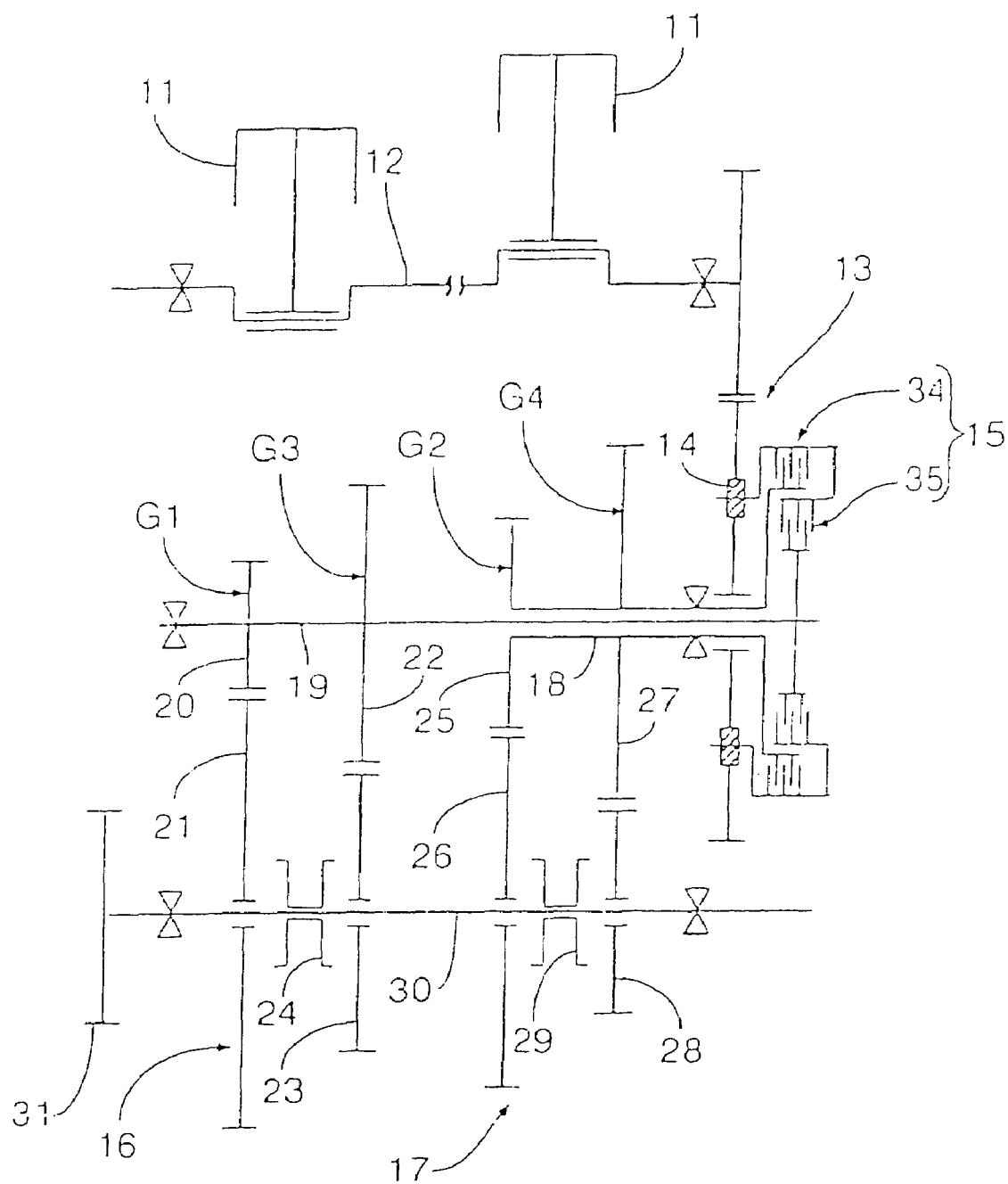
FIG. 1 is a view showing a schematic constitution of a twin clutch type gear transmission.

First of all, in FIG. 1, a plurality of pistons 11, 11, which are provided to a multiple cylinder engine mounted on, for example, a motorcycle is connected to a crankshaft 12 which is rotatably supported on a crankcase not shown in the drawing in common, and a rotational power of the crankshaft 12 is inputted to a twin clutch device 15 by way of a primary gear reduction device 13 and a damper rubber 14. On the other hand, in the inside of the crankcase, an odd-numbered-gear-change gear transmission mechanism 16 which includes odd-numbered gear-change gear trains, for example, first and third gear-change gear trains G1, G3 which can be selectively established and an even-numbered-gear-change gear transmission mechanism 17 which includes even-numbered gear-change gear trains, for example, second and forth gear-change gear trains G2, G4 which can be selectively established are accommodated. The transmission of the power to the odd-numbered-gear-change gear transmission mechanism 16 and the even-numbered-gear-change gear transmission mechanism 17 from the crankshaft 12 by way of a primary speed reduction device 13 and a damper rubber 14 and the disconnection of such power transmission are changed over by the twin clutch device 15.

On the crankcase, a cylindrical first main shaft 18 which has an axis arranged parallel to the crankshaft 12, a second main shaft 19 which coaxially penetrates the first main shaft 18 in a state that the second main shaft 19 is relatively rotatable with respect to the first main shaft 18 while being relatively arranged at a fixed position in the axial direction with respect to the first main shaft 18, and a counter shaft 30 which has an axis thereof arranged parallel to the first and second main shafts 18, 19 are rotatably supported. Here, the even-numbered-gear-change gear transmission mechanism 17 is arranged between the first main shaft 18 and the counter shaft 30, while the odd-numbered-gear-change gear transmission mechanism 16 is arranged between the second main shaft 19 and the counter shaft 30. On an end portion of the counter shaft 30 which rotatably penetrates the crankcase, a drive sprocket wheel 31 is fixed such that a chain for transmitting the power to a rear wheel not shown in the drawing can be wound around the drive sprocket wheel 31.

The second-gear-change gear train G2 is constituted of a second-speed drive gear 25 which is integrally formed with the first main shaft 18 and a second-speed driven gear 26 which is supported on the counter shaft 30 in a relatively rotatable manner with respect to the counter shaft 30 and is meshed with the second-speed drive gear 25. The fourth-gear-change gear train G4 is constituted of a fourth-speed drive gear 27 which is fixed to the first main shaft 18 and a fourth-speed driven gear 28 which is supported on the counter shaft 30 in a relatively rotatable manner with respect to the counter shaft 30 and is meshed with the fourth-speed drive gear 27. Further, at a position between the second and fourth speed driven gears 26, 28, a second shifter 29 is connected to the counter shaft 30 by a spline engagement. Accordingly, due to the axial movement of the second shifter 29, it is possible to change over the gear change state between a state in which the second and fourth speed driven gear 26, 28 are allowed to be freely rotatable with respect to the counter shaft 30 (a neutral state) and a state in which either one of the second and fourth speed driven gears 26, 28 is joined to the counter shaft 30 in a relatively non-rotatable manner with respect to the counter shaft 30 thus establishing either one of the second-gear-change gear train G2 and the fourth-gear-change gear train G4.

The first-gear-change gear train G1 is constituted of a first-speed drive gear 20 which is integrally formed with the second main shaft 19 and a first-speed driven gear 21 which is supported on the counter shaft 30 in a relatively rotatable manner with respect to the counter shaft 30 and is meshed with the first-speed drive gear 20. The third-gear-change gear train G3 is constituted of a third-speed drive gear 22 which is fixed to the second main shaft 19 and a third-speed driven gear 23 which is supported on the counter shaft 30 in a relatively rotatable manner with respect to the counter shaft 30 and is meshed with the third-speed drive gear 22. Further, at a position between the first and third speed driven gears 21, 23, a first shifter 24 is connected to the counter shaft 30 by spline engagement. Accordingly, due to the axial movement of the first shifter 24, it is possible to change over the gear change state between a state in which the first and third speed driven gears 21, 23 are allowed to be freely rotatable with respect to the counter shaft 30a neutral state) and a state in which either one of the first and third speed driven gears 21, 23 is joined to the counter shaft 30 in a relatively non-rotatable manner with respect to the counter shaft 30 thus establishing either one of the first-gear-change gear train G1 and the third-gear-change gear train G3.

Figure 2:
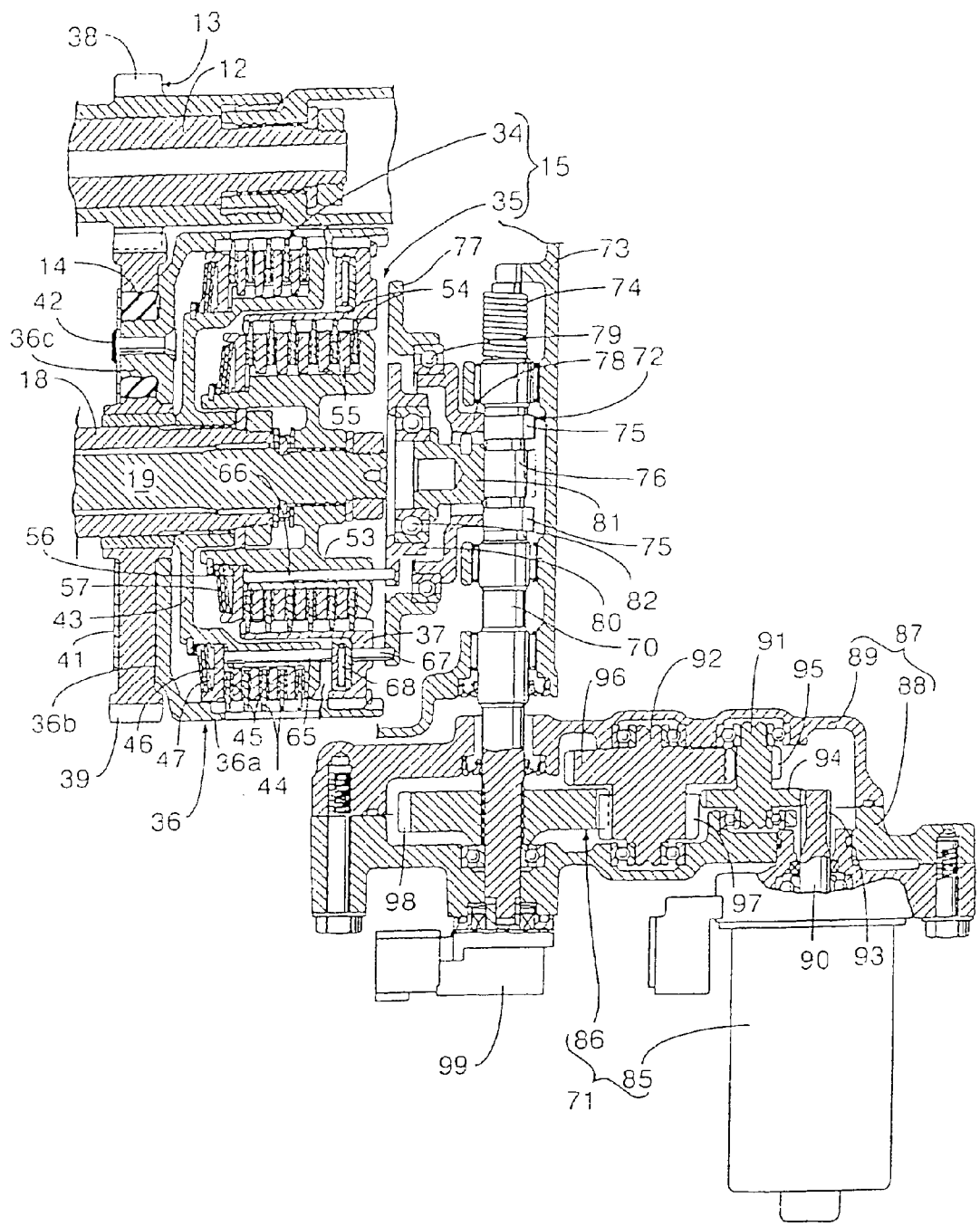
FIG. 2 is a longitudinal-cross-sectional view of a twin clutch device.
Figure 3:
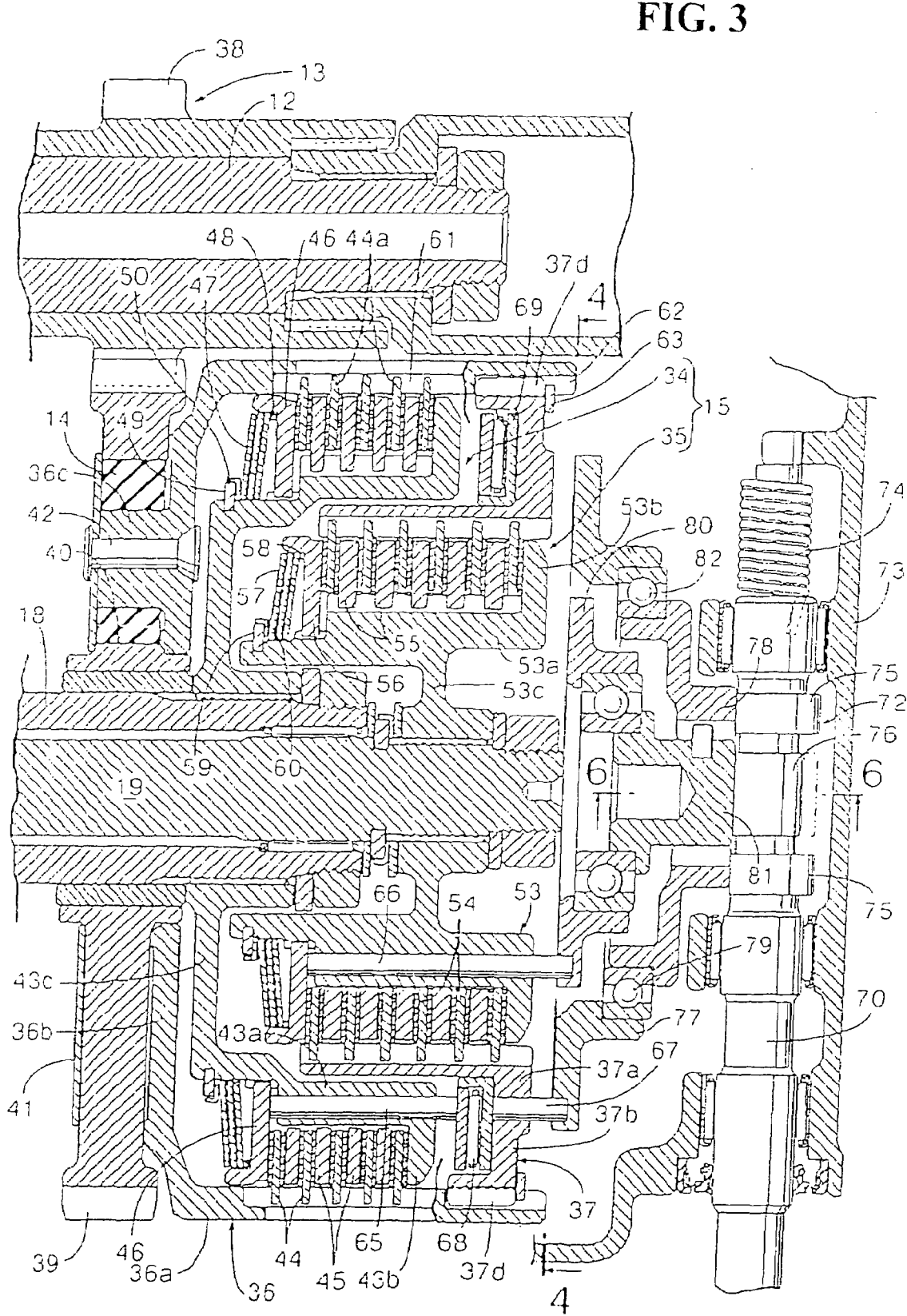
FIG. 3 is an enlarged view of an essential part in FIG. 2.

To explain this embodiment also in conjunction with FIG. 2 and FIG. 3, the twin clutch device 15 has a first clutch 34 of a multiple disc type which includes a first clutch outer 36 which is rotated by power transmitted from the primary speed reduction device 13 and changes over the transmission of the power to the even-numbered-gear-change gear transmission mechanism 17 from the crankshaft 12 and the disconnection of such power transmission, and a second clutch 35 of a multiple disc type which has a second clutch outer 37 which is rotated together with the first clutch outer 36 and is coaxially arranged inside the first clutch 34 in the radial direction, and changes over the transmission of the power to the odd-numbered-gear-change gear transmission mechanism 16 from the crankshaft 12 and the disconnection of such power transmission. The first clutch outer 36 is formed in a bottomed cylindrical shape by integrally connecting an annular plate portion 36b to one end of a cylindrical portion 36a.

The primary speed reduction device 13 is constituted of a drive gear 38 which is integrally formed with the crankshaft 12, and a driven gear 39 which is supported on the second main shaft 19 in a relatively rotatable manner with respect to the second main shaft 19 and is meshed with the drive gear 38. Further, connection bosses 36c . . . are integrally formed on a plurality of circumferential portions of the annular plate portion 36b of the first clutch outer 36 in a projecting manner, and these connection bosses 36c . . . penetrate damper rubbers 14 . . . which are inserted into holding holes 40 . . . which are formed in the driven gear 39, and a holding plate 41 which is brought into contact with the driven gear 39 on a side opposite to the annular plate portion 36b is fastened to end surfaces of the connection bosses 36c using rivets 42 . . . which penetrate the connection bosses 39c . . . . That is, the power transmitted from the crankshaft 12 is inputted to the first clutch outer 36 by way of the primary speed reduction device 13 and the damper rubbers 14 . . . .

The first clutch 34 includes the above-mentioned first clutch outer 36, a first clutch inner 43 which has a cylindrical portion 43a coaxially surrounded by the cylindrical portion 36a of the first clutch outer 36, a plurality of first clutch discs 44 . . . which is engaged with the cylindrical portion 36a of the first clutch outer 36 in a relatively non-rotatable manner with respect to the cylindrical portion 36a, a plurality of first clutch plates 45 . . . which is engaged with the cylindrical portion 43a of the first clutch inner 43 in a relatively non-rotatable manner with respect to the cylindrical portion 43a and is arranged in an alternately overlapped manner with the first clutch discs 44 . . . , an annular first pressure receiving plate portion 43b which faces the first clutch discs 44 and the first clutch plates 45, which are arranged in an alternately overlapped manner from a side opposite to the annular plate portion 36b, an annular first pressure plate 46 which faces the first clutch discs 44 . . . and the first clutch plates 45 . . . which are arranged in an alternately overlapped manner from an annular-plate-portion-36b side, and a first clutch spring 47 which exerts a spring force for biasing the first pressure plate 46 to a side where the first clutch discs 44 . . . and the first clutch plates 45 . . . , are clamped between the first pressure plate 46 and the first pressure receiving plate portion 43b.

The first pressure receiving plate portion 43b 25 integrally projects from an outer end of the cylindrical portion 43a of the first clutch inner 43 in the radially outward direction and is formed in an annular shape. Further, the first clutch inner 43 includes an annular connection plate portion 43c which integrally projects from an inner end of the cylindrical portion 43a in the radially inward direction, and an inner periphery of the connection plate portion 43c is connected to the second main shaft 19 in a relatively non-rotatable manner and also in a relatively non-movable manner in the axial direction with respect to the second main shaft 19.

The first pressure plate 46 is supported on the cylindrical portion 43a of the first clutch inner 43 in a relatively non-rotatable manner and in a relatively movable manner in the axial direction with respect to the cylindrical portion 43a, while an outer periphery of the first clutch spring 47 which is constituted by overlapping a plurality of disc springs is brought into contact with the first pressure plate 47 by way of an annular first spring seat 48. Further, an inner periphery of the first clutch spring 47 is brought into contact with and is supported on a retainer ring 49 which is mounted on an outer periphery of an inner end portion of the cylindrical portion 43a by way of an annular first retainer 50.

Figure 4:
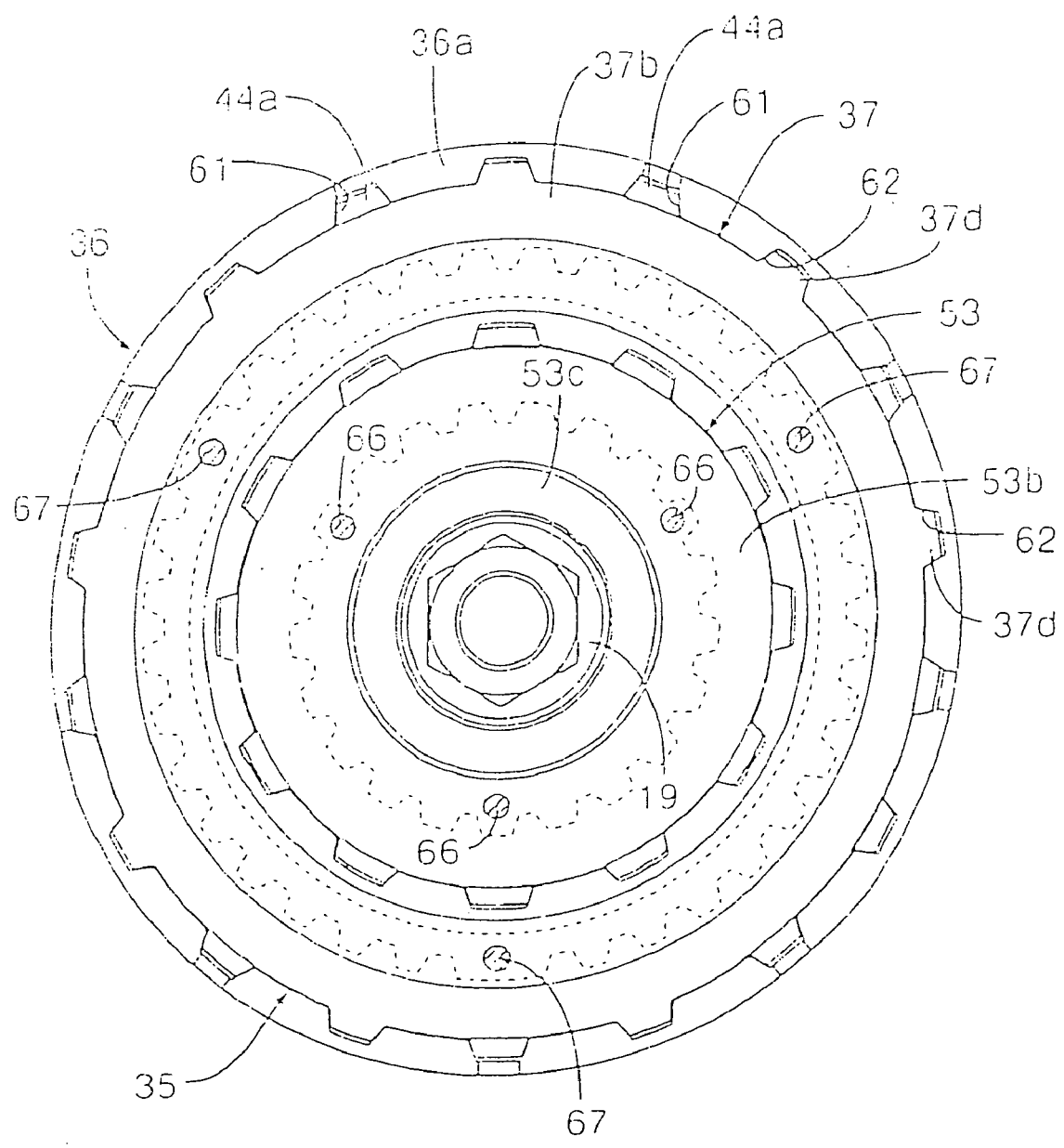
FIG. 4 is a cross-sectional view taken along a line 4-4 in FIG. 3.

To explain this embodiment also in conjunction with FIG. 4, the second clutch 35 includes the second clutch outer 37 which has a cylindrical portion 37a thereof coaxially surrounded by the cylindrical portion 36a of the first clutch outer 36 of the first clutch 34 and is rotated together with the first clutch outer 36, a second clutch inner 53 which has a cylindrical portion 53a thereof coaxially surrounded by the cylindrical portion 37a of the second clutch outer 37, plurality of second clutch discs 54 . . . , which is engaged with the cylindrical portion 37a of the second clutch outer 37 in a relatively non-rotatable manner with respect to the cylindrical portion 37a, a plurality of second clutch plates 55 which is engaged with the cylindrical portion 53a of the second clutch inner 53 in a relatively non-rotatable manner with respect to the cylindrical portion 53a and is arranged in an alternately overlapped manner with the first clutch discs 54 an annular second pressure receiving plate portion 53b which faces the second clutch discs 54 and the second clutch plates 55 . . .

which are arranged in an alternately overlapped manner from a side opposite to the annular plate portion 36b of the first clutch outer 36, an annular second pressure plate 56 which faces the second clutch discs 54 . . . and the second clutch plates 55 . . . which are arranged in an alternately overlapped manner from an annular-plate-portion-36b side, and a second clutch spring 57 which exerts a spring force for biasing the second pressure plate 56 to the side where the second clutch discs 54 . . . and the second clutch plates 55 are clamped between the second pressure plate 56 and the second pressure receiving plate portion 53b.

The second clutch outer 37 integrally includes an annular outer connecting plate portion 37b which projects in the radially outward direction from an outer end of the cylindrical portion 37a, and an annular inner connecting plate portion 37c which projects in the radially inward direction from an axially intermediate portion of the cylindrical portion 37a. Further, the outer connecting plate portion 37b covers the first clutch inner 43 from the outside such that the first clutch inner 43 is arranged between the annular plate portion 36b of the first clutch outer 36 and the outer connecting plate portion 37b and is integrally connected to an outer end of the cylindrical portion 37a. An outer periphery of the connecting plate portion 37b is engaged with the cylindrical portion 36a of the first clutch outer 36 in a relatively non-rotatable manner. Further, an inner periphery of the inner connecting plate portion 37c is connected to the end portion of the first main shaft 18 which projects from the second main shaft 19 in an axially relatively non-movable manner and a relatively non-rotatable manner.

Figure 5:
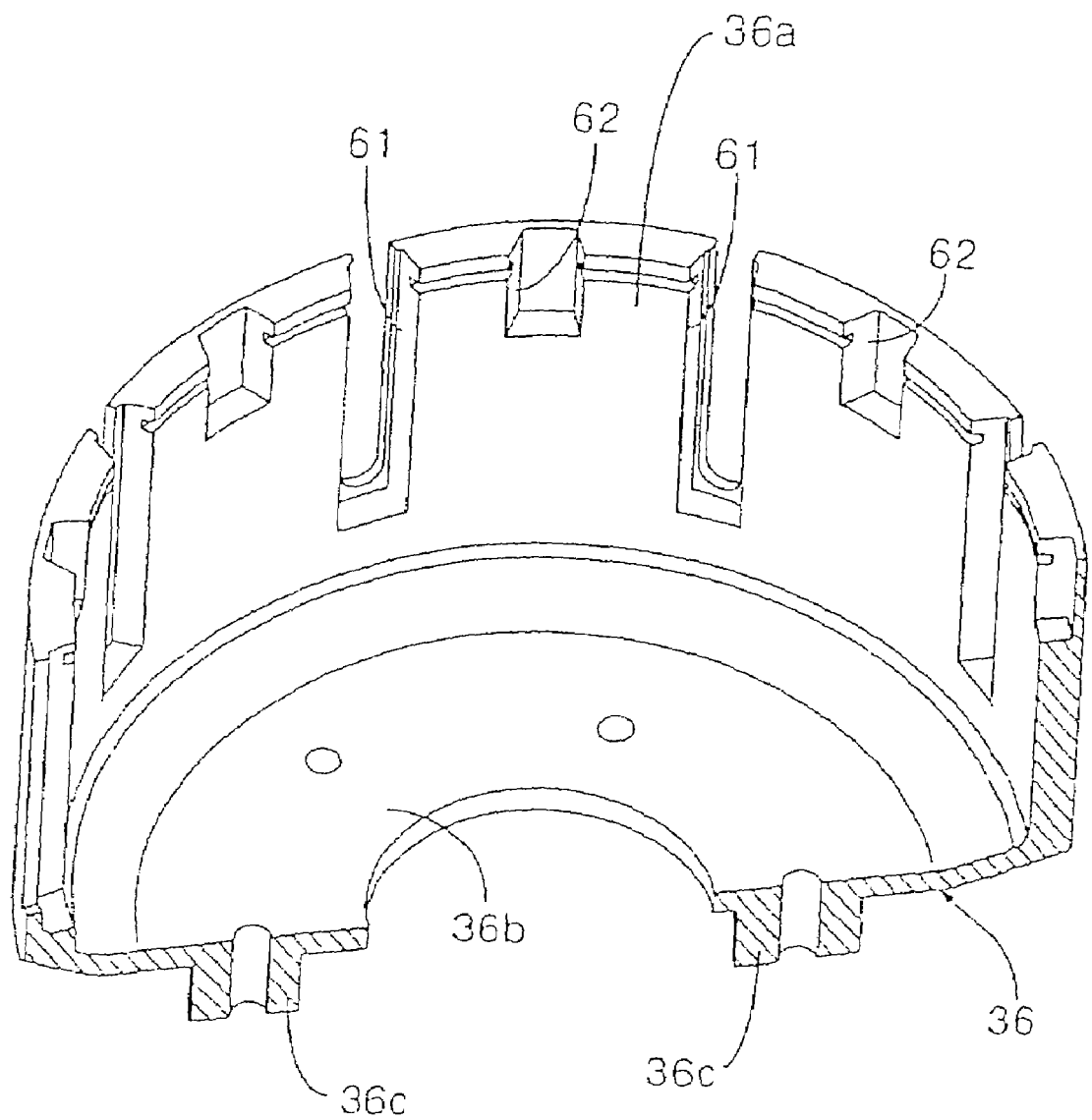
FIG. 5 is a perspective view with a part broken away of a first clutch outer.

Further, to explain this embodiment also in conjunction with FIG. 5, in the cylindrical portion 36a of the first clutch outer 36, a plurality of clutch disc engaging grooves 61, 61 . . . which allows the outer peripheries of the plurality of first clutch discs 54 in the first clutch to be engaged therewith in a relatively non-rotatable manner is formed in the circumferential direction equidistantly and is opened at another end of the cylindrical portion 36a opposite to the annular plate portion 36b. Further, a plurality of clutch outer engaging grooves 62, 62 . . . allows the outer periphery of the outer connecting plate portion 37b of the second clutch outer 37 to be engaged therewith in a relatively non-rotatable manner is formed in a circumferentially equidistant manner and is arranged between the respective clutch disc engaging grooves 61, 61 . . . and, at the same time, is respectively opened at another end of the cylindrical portion 36a. The respective clutch disc engaging grooves 61, 61 . . . are also opened on the outer peripheral surface of the cylindrical portion 36a.

Further, the axially inward movement of the second clutch outer 37 is prevented by a thrust bearing 68 described later, while a retainer ring 63 which is brought into contact with and is engaged with the outer periphery of the outer connecting plate portion 37b of the second clutch outer 37 from the axially outside is mounted on the cylindrical portion 36a of the first clutch outer 36.

Here, on outer peripheries of the first clutch discs 44 engaging projections 44a . . . which are engaged with the respective clutch disc engaging grooves 61, 61 . . . are formed in a projecting manner, while on an outer periphery of the outer connecting plate portion 37b of the second clutch outer 37, engaging projections 37d . . . which are engaged with the respective clutch outer engaging grooves 62, 62 . . . are formed in a projecting manner. An axial length of the clutch disc engaging grooves 61, 61 . . . and an axial length of the clutch outer engaging grooves 62, 62 . . . are set different from each other. In this embodiment, since the connecting plate portion 37b of the second clutch outer 37 is arranged more axially outside than the first clutch discs 44 aid hence, the axial length of the clutch disc engaging grooves 61, 61 . . . is set larger than the axial length of the clutch outer engaging grooves 62, 62

A plurality of, for example, three first lifter pins 65 . . . are provided for applying a control force for driving toward the disconnection side against the spring force of the first clutch spring 47 to the first clutch 34 which maintains the connection state by the spring force of the first clutch spring 47. The first lifter pins 65 . . . have an axis thereof arranged parallel to the rotary axis of the first clutch 34 and axially movably penetrate a plurality of, for example, three portions of the cylindrical portions 43a of the first clutch inner 43 which are arranged circumferentially equidistantly, wherein one ends of these first lifter pins 65 . . . are brought into contact with the first pressure plate 46 of the first clutch 34 in a state that one ends of these first lifter pins 65 . . . can push the first pressure plate 46 against the spring force of the first clutch spring 47.

A plurality of, for example, three second lifter pins 66 are provided for applying a control force for driving toward the disconnection side against the spring force of the second clutch spring 57 to the second clutch 35 which maintains the connection state by the spring force of the second clutch spring 57. The second lifter pins 66 . . . have axes thereof arranged parallel to the rotary axis of the second clutch 35 and axially movably penetrate a plurality of, for example, three portions of the cylindrical portions 53a of the second clutch inner 53 which are arranged circumferentially equidistantly, wherein one ends of these second lifter pins 66 . . . are brought into contact with the second pressure plate 56 of the second clutch 35 in a state that one ends of these second lifter pins 66 can push the second pressure plate 56 against the spring force of the second clutch spring 57.

Further, the second clutch outer 37 which forms a portion of the second clutch 35 sandwiches the first clutch inner 43 with the annular plate portion 36b of the first clutch outer 36. Drive pins 67 . . . which have axes thereof arranged parallel to the rotary axis of the first and second clutches 34, 35 axially movably penetrate a plurality of, for example, three portions of the outer connecting plate portion 37b of the second clutch outer 37 which are arranged in a circumferentially equidistant manner. One ends of the drive pins 67 . . . are connected to one ends of the first lifter pins 65 by way of an annular thrust bearing 68.

Further, to prevent the movement of the thrust bearing 68 on a plane orthogonal to the axis of the first and second clutches 34, 35, an annular recessed portion 69 which accommodates and holds the thrust bearing 68 is formed in the outer connecting plate portion 37b.

To another ends of the second lifter pins 66 . . . and another ends of the drive pins 67 the clutch disconnection/connection control means 72 which has the cam shaft 70 which is rotatable about an axis orthogonal to the rotary axis of the first and second clutches 34, 35 and an actuator 71 which is connected to the cam shaft 70 so as to rotate the cam shaft 70 is interlockingly connected in a state that the clutch disconnection/connection control means 72 pushes and drives the second lifter pins 66 . . . , and the drive pins 67 . . . , independently from each other corresponding to the rotational position of the cam shaft 70.

The cam shaft 70 is rotatably supported on a cover 73 which is joined to a crankcase not shown in the drawing, and a restoring spring 74 is provided between the cam shaft 70 and the cover 73.

Figure 6:
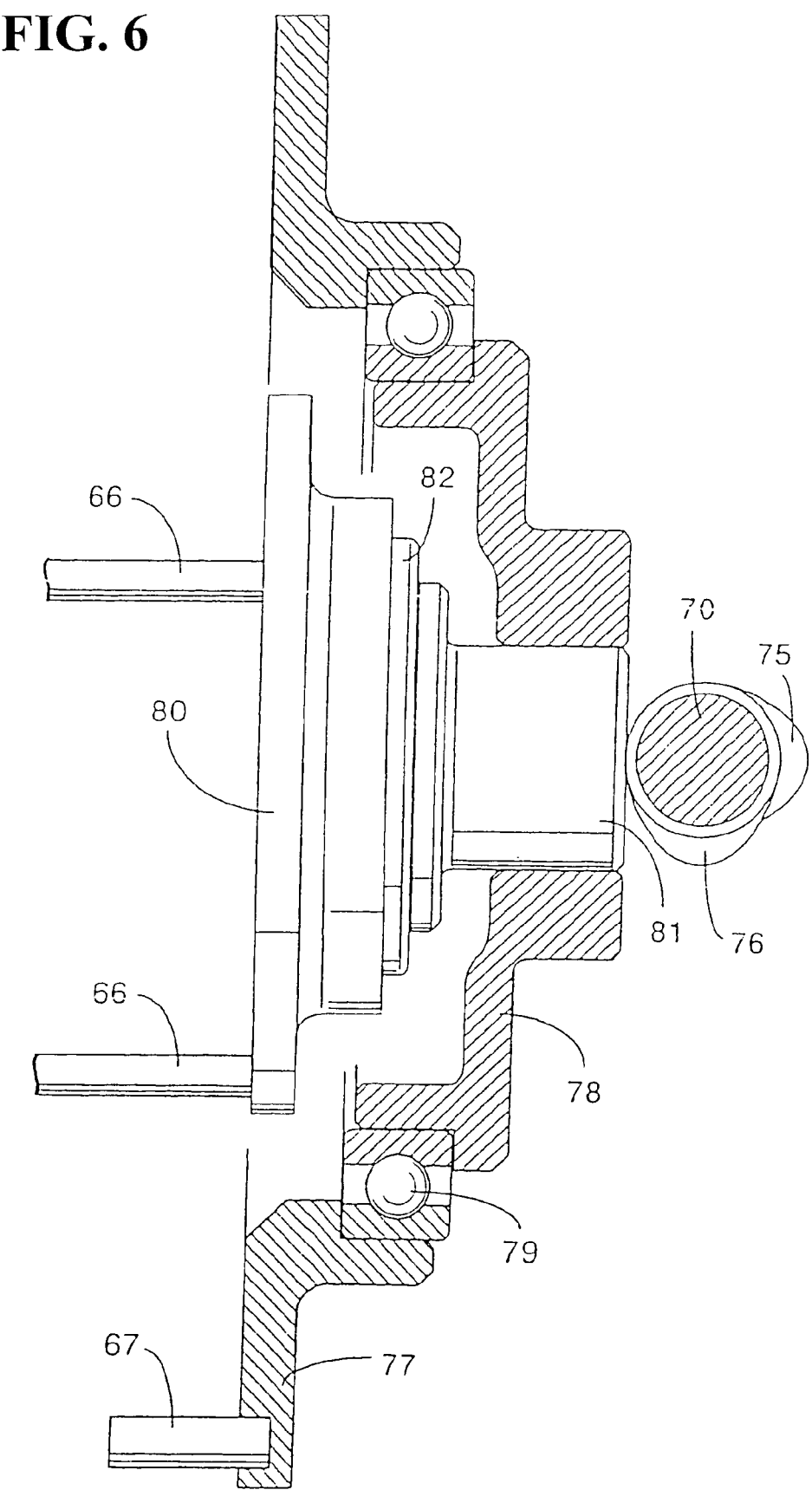
FIG. 6 is an enlarged cross-sectional view taken along a line 6-6 in FIG. 3.

To explain also in conjunction with FIG. 6, a pair of first cams 75, 75 which is arranged in an axially spaced-apart manner and a second cam 76 which is arranged at a center portion between both first cams 75 . . . are integrally formed with the cam shaft 70. The cam shaft 70 is supported on the cover 73 in a state that the second cam 76 is positioned on an axial extension of the first and second main shafts 18, 19.

Another ends of the drive pins 67. are connected to the annular first lifter 77 in common, and a first cam follower 78 which has one end portion thereof connected to the first lifter 77 which is formed in a cylindrical shape and is brought into slidable contact with the first cams 75, 75 by way of a first release bearing 79. Further, another ends of the second lifter pins 66 . . . are connected to an annular second lifter 80 which is coaxially surrounded by the first lifter 77 in common, and a second cam follower 81 is connected to a second lifter 80 which is slidably fitted into the first lifter 77 by way of a second release bearing 82 in a state that the second lifter 81 brings one end thereof into slide contact with the second cam 76.

To explain by focusing on FIG. 2, the actuator 71 is constituted of a single electrically-operated motor 85, and a speed reduction mechanism 86 which transmits an output of the electrically-operated motor 85 to the cam shaft 70 with speed reduction, wherein the electrically-operated motor 85 which performs the rotation parallel to the cam shaft 70 is mounted on a speed reduction mechanism casing 87 which is supported on the crankcase which houses the speed reduction mechanism 86 therein. The speed reduction mechanism casing 87 is formed by joining a pair of casing half bodies 88, 89 to each other, wherein the electrically-operated motor 85 is mounted on one casing half body 88 in a state that an output shaft 90 of the electrically-operated motor 85 projects into the inside of the speed reduction mechanism casing 87.

The speed reduction mechanism 86 is provided between the output shaft 90 of the electrically-operated motor 85 and the cam shaft 70 in the inside of the speed reduction mechanism casing 87. The speed reduction mechanism 86 is constituted of a pinion 93 which is integrally formed with the output shaft 90, a first intermediate gear 94 which is integrally formed with a first intermediate shaft 91 which has an axis thereof arranged parallel to the output shaft 90 and the cam shaft 70 and is rotatably supported on the speed reduction mechanism casing 87 and is meshed with the pinion 93, a second intermediate gear 95 which is integrally formed with the first intermediate shaft 91, a third intermediate gear 96 which is integrally formed with a second intermediate shaft 92 which has an axis thereof arranged parallel to the output shaft 90 and the cam shaft 70 and is rotatably supported on the speed reduction mechanism casing 87 and is meshed with the second intermediate gear 95, a fourth intermediate gear 97 which is integrally formed with the second intermediate shaft 92, and a driven gear 98 which is fixed to the cam shaft 70 and is meshed with the fourth intermediate gear 97.

Further, a potentiometer 99 which is coaxially connected to an end portion of the cam shaft 70 is mounted on the speed reduction mechanism casing 87, wherein a rotational angle of the cam shaft 70 is detected by the potentiometer 99.

Figure 7:
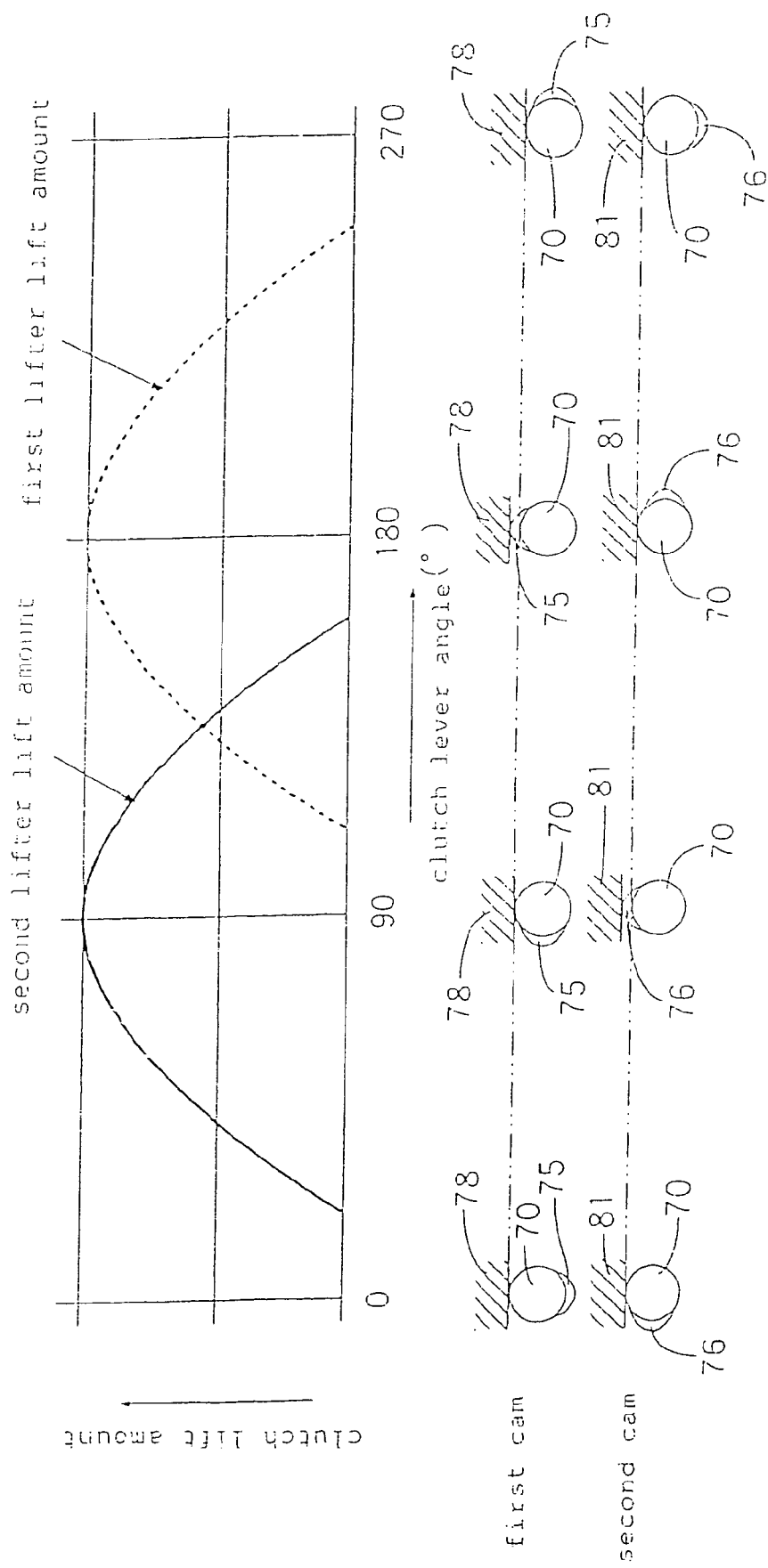
FIG. 7 is a view showing a comparison of a rotational position of a cam shaft and a displacement of a lifter.

Here, the first cams 75 . . . and the second cam 76 are formed on the cam shaft 70 with a phase difference of 90 degrees, for example, there between, wherein the actuator 71 rotatably drives the cam shaft 70 such that the first cams 75 . . . and the second cam 76 are operated as shown in FIG. 7. That is, corresponding to the rotation of the camshaft 70, a lift amount of the first lifter 78 corresponding to the first clutch 34 which changes over the disconnection and connection of the power transmission to the even-numbered-gear-change gear transmission mechanism 17 is changed as indicated by a broken line in FIG. 7, while a lift amount of the second lifter 81 corresponding to the second clutch 35 which changes over the disconnection and connection of the power transmission to the odd-numbered-gear-change gear transmission mechanism 16 is changed as indicated by a solid line in FIG. 7.

That is, the actuator 71 rotatably drives the cam shaft 70 to change over a gear-change state between a state in which either one of the first and second clutches 34, 35 is connected and the other is disconnected and a state in which both of the first and second clutches 34, 35 are connected.

The principle of the operation of the actuator 71 brings one of the first and second clutches 34, 35 into a connection state and the other into an disconnection state under a usual operation condition and hence, a change-gear state attributed to either one of the even-numbered-gear-change gear train and the odd-numbered-gear-change gear train can be obtained using one of the even-numbered-gear-change gear transmission mechanism 17 and the odd-numbered-gear-change gear transmission mechanism 16 is obtained. In the even-numbered-gear-change gear transmission mechanism 17 and the odd-numbered-gear-change gear transmission mechanism 16, at the time of changing over the gear change from the above-mentioned usual operation condition, one of the first and second shifters 29, 24 is operated so as to preliminarily establish the gear train of the next gear-change stage which follows depending on the gear change direction out of the first to fourth gear-change gear trains GI to G4 in a state that the clutch which corresponds to the above-mentioned gear train of the next gear change stage out of both clutches 34, 35 is disconnected and, thereafter, the disconnection and the connection of both clutches 34, 35 are changed over due to the operation of the above-mentioned actuator 71.

For example, in performing the gear change from the first gear-change stage to the second gear-change stage, in a state that a speed change ratio of the first gear-change stage is obtained by establishing the first-gear-change gear train G1 of the odd-numbered-gear-change gear transmission mechanism 16 and by bringing the second clutch 35 into a connection state, the second-gear-change gear train G2 of the even-numbered-gear-change gear transmission mechanism 17 is established by bringing the first clutch 34 into an disconnected state, thereafter, the second clutch 35 is disconnected and the first clutch 34 is connected.

Here, in performing the gear-change changeover between the even-numbered-gear-change stages or between the odd-numbered-gear-change stages, when the clutch corresponding to the gear transmission mechanism which becomes an object of changeover for establishing the gear train out of the even-numbered-gear-change gear transmission mechanism 17 and the odd-numbered-gear-change gear transmission mechanism 16 is held in an disconnected state, immediately before the completion of the changeover of the establishment of the gear train, the first main shaft 18 or the second main shaft 19 which is arranged at an input side of the gear transmission mechanism is rotated at a rotational speed before the changeover of the establishment of the gear train is performed, while when the changeover of the establishment of the gear train is completed, the rotational speed of the first main shaft 18 or the second main shaft 19 is largely changed thus generating the transmission shock.

Figure 8A:
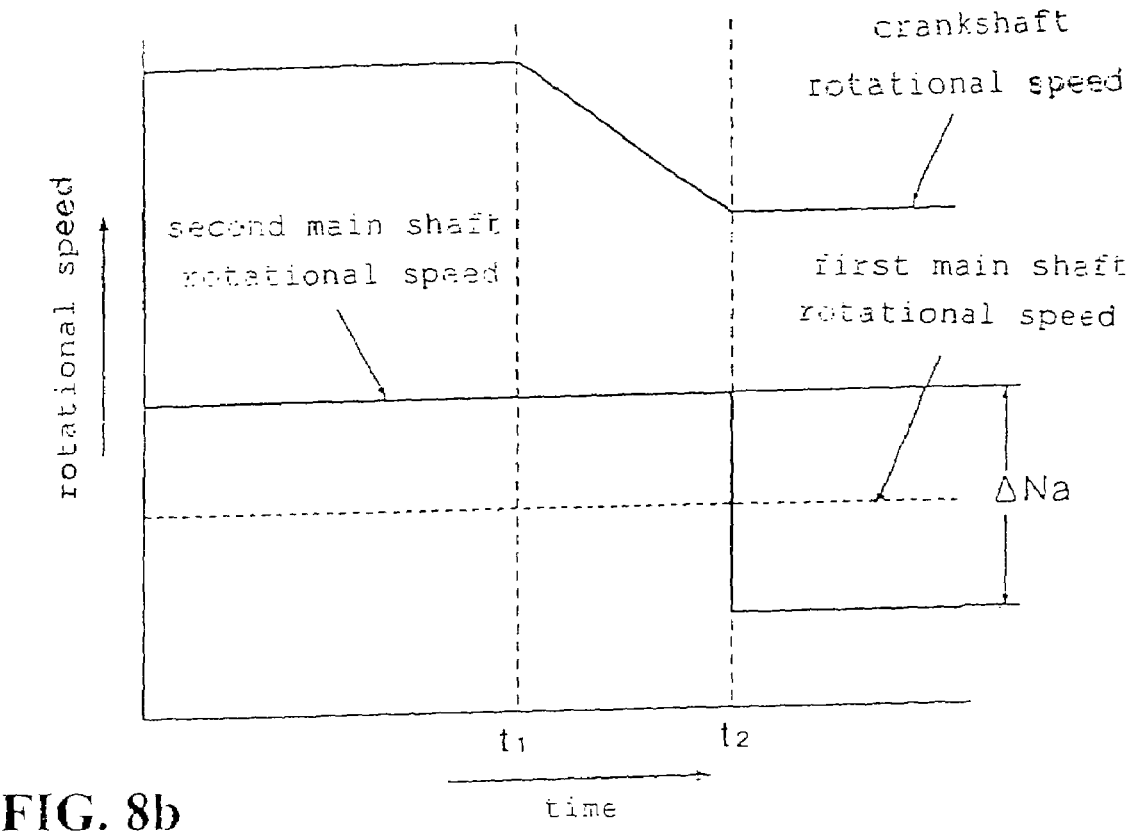
FIGS. 8A and 8B are views showing a gear-change characteristic at the time of performing a shift-up operation.

For example, to consider the shift-up of the speed change ratio from the first gear-change stage to the third gear-change stage, at the time of operating the second shifter 24 from a state in which the first gear-change gear train G1 is established to a state in which the third gear-change gear train G3 is established in the odd-numbered-gear-change gear transmission mechanism 16, when the second clutch 35 is held in an disconnected state, rotational speeds of the crankshaft 12, the first main shaft 18 and the second main shaft 19 are changed as shown in FIG. 8A. That is, at a point of time t1 in a state that the speed change ratio of the first-gear-change stage is obtained by establishing the first-gear-change gear train G1 in the odd-numbered-gear-change gear transmission mechanism 16 and by establishing the second-gear-change-gear train G2 in the even-numbered-gear-change gear transmission mechanism 17 by disconnecting the first clutch 34 while connecting the second clutch 35, when the first clutch 34 is connected while disconnecting the second clutch 35, the second main shaft 19 is rotated at a rotational speed equal to the rotational speed before the point of time t1, and when the third-gear-change gear train G3 is established in the odd-numbered-gear-change gear transmission mechanism 16 at a point of time t2 in such a state, the rotational sped of the second main shaft 19 is largely changed to the reduction side by ΔNa thus increasing the transmission shock.

Figure 9A:
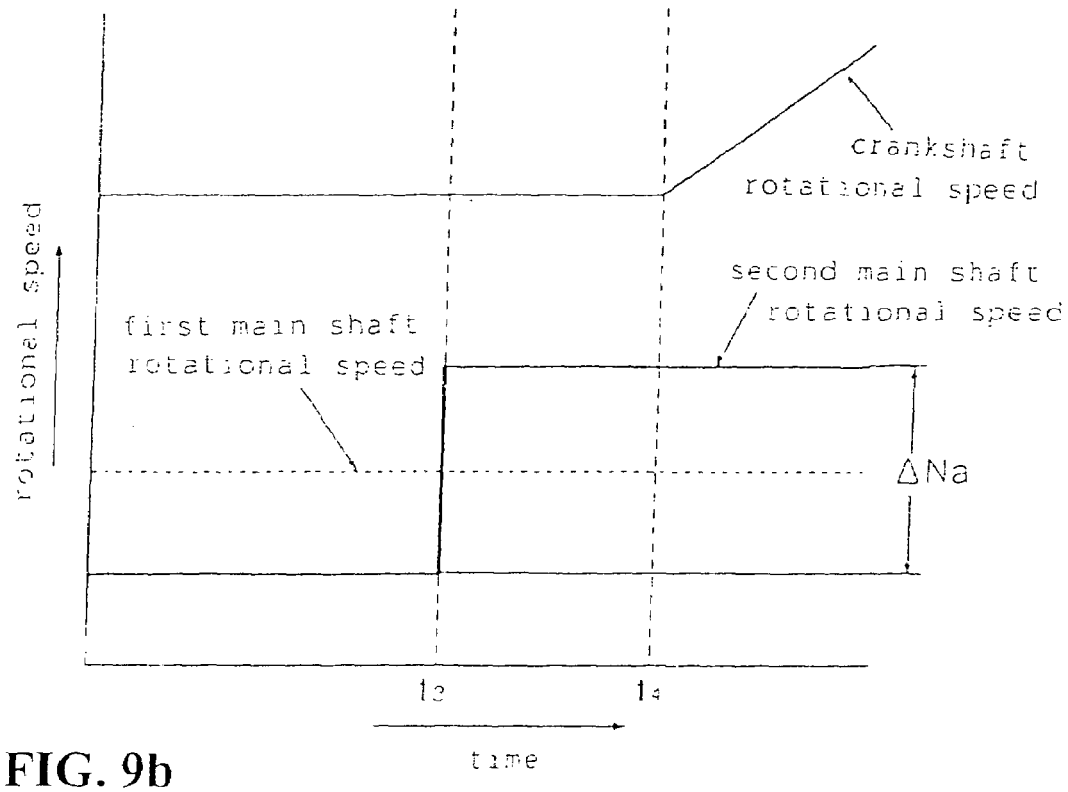
FIGS. 9A and 9B are views showing a gear-change characteristic at the time of performing a shift-down operation.

Further, to consider the shift-down of the speed change ratio from the third gear-change stage to the first gear-change stage, at the time of operating the second shifter 24 from a state in which the third gear-change gear train G3 is established to a state in which the first gear-change gear train G1 is established in the odd-numbered-gear-change gear transmission mechanism 16, when the second clutch 35 is held in an disconnected state, the rotational speeds of the crankshaft 12, the first main shaft 18 and the second main shaft 19 are changed as shown in FIG. 9A. That is, at a point of 10 time t3 in a state that the speed change ratio of the second-gear-change stage is obtained by disconnecting the second clutch 35 while connecting the first clutch 34 by establishing the third-gear-change gear train G3 in the odd-numbered-gear-change gear transmission mechanism 16 and by establishing the second-gear-change gear train G2 in the even-numbered-gear-change gear transmission mechanism 17, the changeover of the established state from the third-gear-change gear train G3 to the first-gear-change gear train G1 in the odd-numbered-gear-change gear transmission mechanism 16 is started and, thereafter, at a point of time t4, when the second clutch 35 is connected and, at the same time, the first clutch 34 is disconnected, at the point of time t3 at which the establishment state of the speed change ratio is changed over from the third-gear-change gear train G3 to the first-gear-change gear train G1, the rotational speed of the second main shaft 19 is largely changed to the increase side by ΔNa thus increasing the transmission shock.

Accordingly, in performing the changeover of change-gear ratio between the even-numbered gear-change stages or between the odd-numbered-gear-change stages, when one of the even-numbered-gear-change gear transmission mechanism 17 and the odd-numbered-gear-change gear transmission mechanism 16 assumes a neutral state in the midst of the changeover of the establishment of the gear train, a transmission control is performed such that the clutch corresponding to the gear transmission mechanism which becomes an object of changeover for establishment of the gear train out of the even-numbered-gear-change gear transmission mechanism 17 and the odd-numbered-gear-change gear transmission mechanism 16 is temporarily held in a connection state only for a short time from the disconnected state and, after being disconnected again, the clutch is changed over from the disconnected state to a connection state after completion of the changeover for establishing the gear train.

Figure 8B:
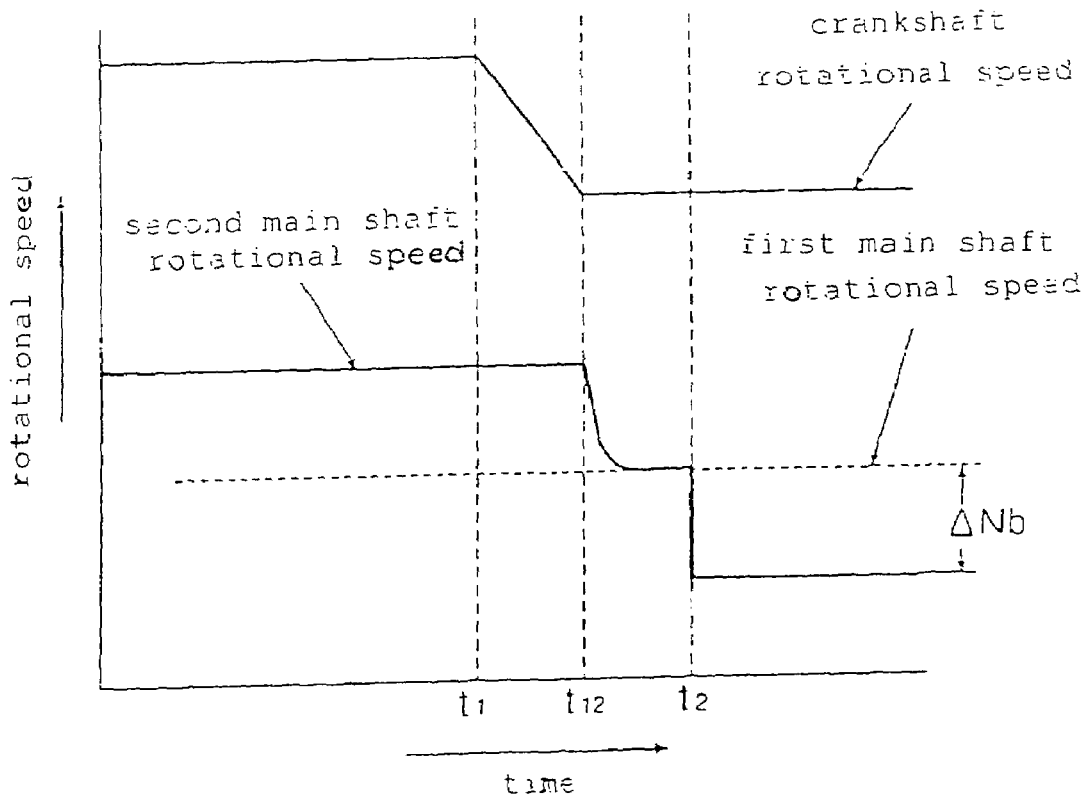

Accordingly, for example, to consider the shift-up of the speed change ratio from the first gear-change stage to the third gear-change stage, at the time of operating the second shifter 24 from a state in which the first gear-change gear train G1 is established to a state in which the third gear-change gear train G3 is established in the odd-numbered-gear-change gear transmission mechanism 16, when the second clutch 35 is temporarily held in a connection state only for a short time with the odd-numbered-gear-change gear transmission mechanism 16 in a neutral state, the rotational speeds of the crankshaft 12, the first main shaft 18 and the second main shaft 19 are changed as shown in FIG. 8B. That is, at a point of time t1 in a state that the speed change ratio of the first-gear-change stage is obtained by establishing the first-gear-change gear train G1 in the odd-numbered-gear-change gear transmission mechanism 16 and by establishing the second-gear-change-gear train G2 in the even-numbered-gear-change gear transmission mechanism 17 by disconnecting the first clutch 34 while connecting the second clutch 35, the second clutch 35 is disconnected and, at the same time, the first clutch 34 is connected. Thereafter, at a point of time t12 in a state that the odd-numbered-gear-change gear transmission mechanism 16 assumes a neutral state in the midst of the changeover of the establishment of the gear train from the first-gear-change gear train G1 to the third-gear-change gear train G3, when the second clutch 35 is temporarily held in a connection state only for a short time (that is, both of the first and second clutches 34, 35 are temporarily held in connection state only for a short time), since the first clutch 34 is in a connection state and the second-gear-change gear train G2 of the even-numbered-gear-change gear transmission mechanism 17 is established, the rotational speed of the second main shaft 19 is lowered to the same level as the first main shaft 18 and, further, a rotational-speed change amount of the second main shaft 19 when the third-gear-change-gear train G3 is established at the point of time t2 assumes a relatively small value ΔNb (<ΔNa) whereby the transmission shock can be alleviated.

Figure 9B:
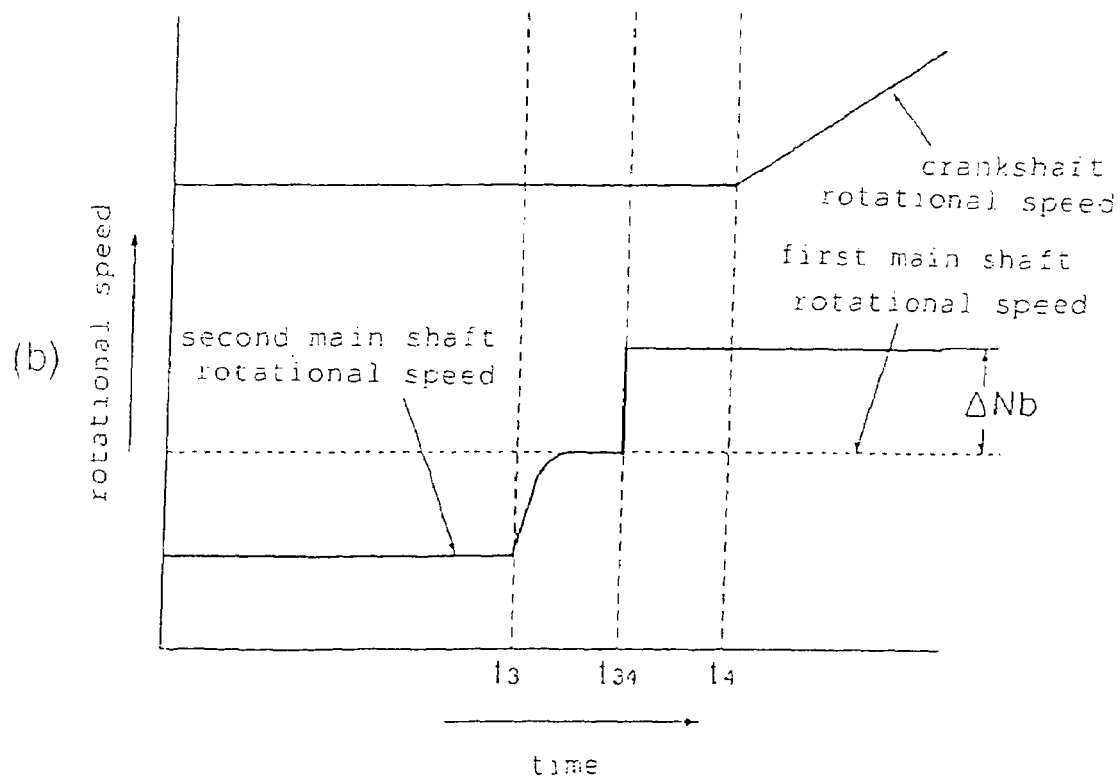

Further, for example, to consider the shift-down of the speed change ratio from the third gear-change stage to the first gear-change stage, at the time of operating the second shifter 24 from a state in which the third gear-change gear train G3 is established to a state in which the first gear-change gear train G1 is established in the odd-numbered-gear-change gear transmission mechanism 16, when the second clutch 35 is temporarily held in a connection state only for a short time with the odd-numbered-gear-change gear transmission mechanism 16 in a neutral state, the rotational speeds of the crankshaft 12, the first main shaft 18 and the second main shaft 19 are changed as shown in FIG. 9B. That is, in a state that the speed change ratio of the second-gear-change stage is obtained by connecting the first clutch 34 and by disconnecting the second clutch 35 by establishing the third-gear-change gear train G3 in the odd-numbered-gear-change gear transmission mechanism 16 and by establishing the second-gear-change-gear train G2 in the even-numbered-gear-change gear transmission mechanism 17, at a point of time t3 in a state that the odd-numbered-gear-change gear transmission mechanism 16 assumes a neutral state at the time of changing over the establishment state of the gear train from the third-gear-change gear train G3 to the first-gear-change gear train G1, when the second clutch 35 is temporarily held in a connection state only for a short time (that is, both of the first and second clutches 34, 35 are temporarily held in connection state only for a short time), since the first clutch 34 is in a connection state and the second-gear-change gear train G2 of the even-numbered-gear-change gear transmission mechanism 17 is established, the rotational speed of the second main shaft 19 is increased to the same level as the rotational speed of the first main shaft 18 and, further, a rotational-speed change amount of the second main shaft 19 when the first-gear-change-gear train G1 is established at the point of time t34 assumes a relatively small value ΔNb (<ΔNa) whereby the transmission shock can be alleviated.

Next, the manner of operation of this embodiment is explained. In the twin clutch device 15 which includes the first clutch 34 having the first clutch outer 36 which has the annular plate portion 36b integrally and contiguously formed with one end of the cylindrical portion 36a, and the second clutch 35 which is coaxially arranged with the first clutch 34 radially inside the first clutch 34, the first and second pressure plates 46, 56 having a ring shape which changes over the disconnection and connection state of the first and second clutches 34, 35 are respectively axially operably supported on the annular-plate-portion-36b-side end portions of the first and second clutch inners 43, 53 which are respectively provided to the first and second clutches 34, 35. Further, the first and second clutch springs 47, 57 which bias these pressure plates 46, 56 to the connection side are respectively arranged at the annular-plate-portion-36b-side end portions of the first and second clutch inners 43, 53. The first and second lifter pins 65, 66 which have axis thereof arranged parallel to the rotary axis of the first and second clutches 34, 35 and penetrate both clutch inners 43, 53 in an axially movable manner bring respective one ends thereof into contact with the pressure plates 46, 56 in a state that one ends can push the pressure plates 46, 56 against the spring biasing forces of the clutch springs 47, 57, Further, the drive pin 67 which has an axis thereof arranged parallel to the rotary axis of the first and second clutches 34, 35 and penetrates the outer connecting plate portion 37b of the second clutch outer 37 in an axially movable manner has one end thereof connected to another end of the first lifter pin 65 which penetrates the first clutch inner 43 out of both lifter pins 65, 66 by way of the thrust bearing 68.

Accordingly, by axially pushing the first and second lifter pins 65, 66 which respectively penetrate the first and second clutch inners 43, 53 by applying the external force to the first and second lifter pins 65, 66, it is possible to bring the first and second clutches 34, 35 into a disconnection state. Further, the first clutch inner 43 is arranged between the annular plate portion 36b of the first clutch outer 36 and the outer connecting plate portion 37b of the second clutch outer 37, while the second clutch outer 37 is relatively rotatable with respect to the first clutch inner 43, and one end of the drive pin 67 which axially movably penetrates the outer connecting plate portion 37b is connected to the other end of the first lifter pin 65 which penetrates the first clutch inner 43 by way of the rust bearing 68. Accordingly, irrespective of the relative rotation between the first clutch inner 43 and the second clutch outer 37, it is possible to axially drive the first lifter pin 65. Due to the simple constitution in which the thrust bearing 68 is interposed between the first lifter pin 65 and the drive pin 67, it is possible to bring the first clutch 34 which includes the first clutch inner 4.3 into the disconnection state by applying the external force.

Further, since the operating directions and the driving directions of the first and second lifter pins 65, 66 are set equal to each other, it is possible to simplify the constitution of the clutch disconnection/connection control means 72 for performing the disconnection/connection driving of the first and second clutches 34, 35.

Further, since the annular spring seats 48, 58 are respectively interposed between the first and second clutch springs 47, 57 and the first and second pressure plates 46, 56 it is possible to uniformly apply the spring forces of the first and second clutch springs 47, 57 to the whole peripheries of the pressure plates 46, 56 thus ensuring the reliable changeover of the disconnection/connection of the first and second clutches 34, 35.

Further, to another ends of the second lifter pin 66 and the drive pin 67, the clutch disconnection/connection means 72 having the cam shaft 70 which is rotatable about an axis arranged orthogonal to the rotary axis of the first and second clutches 34, 35 and forms the first and second cams 75 . . . , 76 which individually correspond to the first and second clutches 34, 35 thereon is interlockingly connected in a state that the clutch disconnection/connection means 72 pushes and drives the second lifter pin 66 and the drive pin 67 independently from each other corresponding to the rotational position of the cam shaft 70. In this manner, it is possible to perform the changeover of disconnection/connection of the first and second clutches 34, 35 independently from each other with the use of the clutch disconnection/connection control means 72 which is used in common by the first and second clutches 34, 35 and hence, it is possible to simplify the structure which applies an external force for changing over the disconnection/connection to the first and second clutches 34, 35.

Further, the cam shaft 70 is rotatably driven by the single actuator 71 and hence, it is sufficient to provide one actuator 71 for rotatably driving the can shaft 70 whereby the number of parts can be reduced and, at the same time, the structure can be simplified. Further, the use of the single actuator 70 also leads to the reduction of a manufacturing cost and the miniaturization of the twin clutch device.

Further, the actuator 71 is constituted of the single electrically-operated motor 85 and the speed reduction mechanism 86 which transmits the outputs of the electrically-operated motor 85 to the cam shaft 70 with speed reduction and hence, the actuator 71 can have the light-weighted and compact constitution.

Here, to the cylindrical partition 36a provided to the first clutch outer 35 of the first clutch 34, the plurality of clutch disc engaging grooves 61 . . . which allows the outer peripheries of the plurality of first clutch discs 44, to be engaged therewith in a relatively non-rotatable manner and the plurality of clutch outer engaging grooves 62 . . . which are arranged between the respective clutch disc engaging grooves 61 in a state that the outer periphery of the second clutch outer 37 provided to the second clutch outer 35 is allowed to be engaged with the clutch outer engaging grooves 62 . . . in a relatively non-rotatable manner are respectively provided.

That is, the outer peripheries of the first clutch discs 44 are engaged with the cylindrical portion 36a of the first clutch outer 36 in a relatively non-rotatable manner and, at the same time, the outer periphery of the second clutch outer 37 is engaged with the cylindrical portion 36a of the first clutch outer 36 in a relatively non-rotatable manner and hence, in connecting the first and second clutch outers 36, 37 in a relatively non-rotatable manner, it is possible to preventing the diameters of the outer circumferences of the first and second clutch outers 36, 37 from being increased thus realizing the miniaturization of the twin clutch device 15, Further, due to such a constitution, the number of parts can be reduced and, at the same time, man-hours for assembling can be reduced thus facilitating the assembling.

Further, the second clutch outer 37 is arranged at a position where the second clutch outer 37 sandwiches the first clutch inner 43 provided to the first clutch 34 with the annular plate portion 36b, and the retainer ring 63 which is brought into contact with and is engaged with the outer periphery of the second clutch outer 37 from the axially outside is mounted on the cylindrical portion 36a and hence, it is possible to prevent the axially outward movement of the second clutch outer 37 with respect to the first clutch outer 36 with the simple constitution.

Further, the axial length of the clutch disc engaging grooves 61 . . . and the axial length of the clutch outer engaging grooves 62 . . . are set different from each other and hence, it is possible to easily prevent the erroneous assembling of the first clutch discs 44 . . . and the second clutch outer 37 to the first clutch outer 36 thus also facilitating the assembling.

Further, the plurality of clutch disc engaging grooves 61 . . . and the plurality of clutch outer engaging grooves 62 are circumferentially equidistantly formed in another end of the cylindrical portion 36a opposite to the annular plate portion 36b of the first clutch outer 36 in a state that the engaging grooves 61, 62 . . . open at another end of the cylindrical portion 36a and hence, the assembling of the plurality of first clutch discs 44 and the second clutch outer 37 to the first clutch outer 36 can be further facilitated.

Further, in the usual operation condition, one of the first and second clutches 34, 35 is connected and the other is disconnected thus obtaining the gear change state attributed to one gear train of the even-numbered gear-change stage and the odd-numbered gear-change stage and hence, it is possible to suppress a friction loss in the usual operation condition.

Further, in performing the changeover of the transmission for changing the speed change ratio from the usual operation condition, the gear train of the next gear-change stage which follows depending on the gear change direction out of the plurality of gear-change gear trains, that is, the first to fourth gear-change gear trains G1 to G4 is preliminarily establish in a state that the clutch which corresponds to the above-mentioned gear train is disconnected and, thereafter, the disconnection and the connection of both clutches 34, 35 are changed over and hence, the transmission control attributed to the disconnection/connection control of both clutches 34, 35 can be facilitated and, at the same time, the transmission responsibility can be enhanced.

Further, in performing the changeover of change-gear ratio between the even-numbered gear-change stages or between the odd-numbered-gear-change stages, when one of the even-numbered-gear-change gear transmission mechanism 17 and the odd-numbered-gear-change gear transmission mechanism 16 assumes a neutral state in the midst of the changeover of the establishment of the gear train, the clutch corresponding to the gear transmission mechanism which becomes the object of changeover for establishment of the gear train out of the even-numbered-gear-change gear transmission mechanism 17 and the odd-numbered-gear-change gear transmission mechanism 16 is temporarily held in a connection state for a short time from the disconnected state and, after being disconnected again, the clutch is changed over from the disconnected state to a connection state after completion of the changeover for establishing the gear train. Accordingly, as has been explained in conjunction with the above-mentioned FIG. 8B and FIG. 9B, it is possible to alleviate the transmission shock when the changeover of the establishment of the gear train is completed.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A speed change control method for a twin clutch gear transmission which includes an even-numbered-gear-change gear transmission mechanism and an odd-numbered-gear-change gear transmission mechanism, the method comprising the steps of:
    selectively establishing a plurality of even-numbered gear-change gear trains in the even-numbered-gear-change gear transmission mechanism;
    selectively establishing a plurality of odd-numbered gear-change gear trains in the odd-numbered-gear-change gear transmission mechanism;
    individually changing over disconnection and connection of power transmission between a pair of clutches each of which is capable of individually changing over the disconnection and the connection of power transmission between a pair input shafts and a power source, the input shafts corresponding respectively to the even-numbered-gear-change gear transmission mechanism and the odd-numbered-gear-change gear transmission mechanism;
    bringing one of the clutches into a connection state; and
    bringing the other of the clutches into a disconnection state under a usual operation condition in which a speed change ratio is fixed, and
    during performing a changeover of a speed change between the even-numbered gear-change stages or between the odd-numbered-gear-change stages, when one of the even-numbered-gear-change gear transmission mechanism and the odd-numbered-gear-change gear transmission mechanism assumes a neutral state during the changeover for establishing the gear train, the clutch corresponding to the gear transmission mechanism which becomes an object of changeover for establishing the gear train out of the even-numbered-gear-change gear transmission mechanism and the odd-numbered-gear-change gear transmission mechanism is changed over to a connection state from the disconnection state and, after being disconnected again, the clutch is changed over from the disconnection state to the connection state after completing the changeover for establishing the gear train.

2. The speed change control method for a twin clutch gear transmission according to claim 1, wherein when one of the even-numbered-gear-change gear transmission mechanism and the odd-numbered-gear-change gear transmission mechanism assumes the neutral state during the changeover of establishing the gear train, and the other of gear transmission mechanisms is an object of the changeover for establishing the gear train in the disconnection state, the method further comprising the step of:
    setting a predetermined time during which the clutch corresponding to the other gear transmission mechanism is temporarily changed over to the connection state.

3. The speed change control method for a twin clutch gear transmission according to claim 2, wherein during performing a shift-down operation of a speed change ratio between the even-numbered gear-change stages or between the odd-numbered-gear-change stages, when one of the even-numbered-gear-change gear transmission mechanism and the odd-numbered-gear-change gear transmission mechanism assumes the neutral state during the changeover of establishing the gear train, the method further comprises the steps of:
    holding both of the clutches in the connection state only for the predetermined time, and thereafter,
    disconnecting one of the clutches in order to establish a lower gear-change gear train.

4. The speed change control method for a twin clutch gear transmission according to claim 2, wherein during performing a shift-up operation of a speed change ratio between the even-numbered gear-change stages or between the odd-numbered-gear-change stages, when one of the even-numbered-gear-change gear transmission mechanism and the odd-numbered-gear-change gear transmission mechanism assumes the neutral state during the changeover of establishing the gear train, the method further comprises the steps of:

holding of the clutches in the connection state only for the predetermined time; and thereafter disconnecting one of the clutches, thereby establishing an upper gear-change gear train.

5. The speed change control method for a twin clutch gear transmission according to claim 1, wherein during performing a shift-down operation of a speed change ratio between the even-numbered gear-change stages or between the odd-numbered-gear-change stages, when one of the even-numbered-gear-change gear transmission mechanism and the odd-numbered-gear-change gear transmission mechanism assumes a the neutral state during the changeover of establishing the gear train, the method further comprises the steps of:

holding both of the clutches in the connection state only for a predetermined time, and thereafter, disconnecting one of the clutches in order to establish a lower gear-change gear train.

6. The speed change control method for a twin clutch gear transmission according to claim 1, wherein during performing a shift-up operation of a speed change ratio between the even-numbered gear-change stages or between the odd-numbered-gear-change stages, when one of the even-numbered-gear-change gear transmission mechanism and the odd-numbered-gear-change gear transmission mechanism assumes the neutral state during the changeover of establishing the gear train, the method further comprises the steps of:

holding of the clutches in the connection state only for a predetermined time; and thereafter disconnecting one of the clutches, thereby establishing an upper gear-change gear train.

7. A speed change control method for a twin clutch gear transmission which includes an even-numbered-gear-change gear transmission mechanism having a first input shaft and an odd-numbered-gear-change gear transmission mechanism having a second input shaft, the method comprising the steps of:

selectively establishing a plurality of even-numbered gear-change gear trains in the even-numbered-gear-change gear transmission mechanism;

selectively establishing a plurality of odd-numbered gear-change gear trains the odd-numbered-gear-change gear transmission mechanism;

individually changing over disconnection and connection of power transmission between the first and second input shaft and a power source using a pair of clutches; and bringing one of the pair of clutches into a connection state and bringing the other of the pair of clutches into a disconnection state during a usual operating condition in which a speed change ratio is fixed, and during changing a speed between even-numbered gear-change stages or between odd-numbered-gear-change stages, when one of the even-numbered-gear-change gear transmission mechanism and the odd-numbered-gear-change gear transmission mechanism assumes a neutral state during the changeover for establishing the gear train, the method further comprising the step of:

changing over to the connection state from the disconnection the clutch corresponding to the gear transmission mechanism which becomes an object of the changeover for establishing the gear train out of the even-numbered-gear-change gear transmission mechanism and the odd-numbered-gear-change gear transmission mechanism state, and changing over the clutch from the disconnection state to the connection state after completing of the changeover for establishing the gear train.

8. The speed change control method for a twin clutch gear transmission according to claim 7, wherein when one of the even-numbered-gear-change gear transmission mechanism and the odd-numbered-gear-change gear transmission mechanism assumes the neutral state during the changeover for establishing the gear train, and the other of gear transmission mechanisms is an object of the changeover for establishing the gear train in the disconnection state, the method further comprising the step of:

setting a predetermined time during which the clutch corresponding to the other gear transmission mechanism is temporarily changed over to the connection state.

9. The speed change control method for a twin clutch gear transmission according to claim 8, wherein during performing a shift-down operation of a speed change ratio between the even-numbered gear-change stages or between the odd-numbered-gear-change stages, when one of the even-numbered-gear-change gear transmission mechanism and the odd-numbered-gear-change gear transmission mechanism assumes the neutral state during the changeover for establishing the gear train, the method further comprises the steps of:

holding both of the clutches in the connection state only for the predetermined time, and thereafter, disconnecting one of the clutches in order to establish a lower gear-change gear train.

10. The speed change control method for a twin clutch gear transmission according to claim 8, wherein during performing a shift-up operation of a speed change ratio between the even-numbered gear-change stages or between the odd-numbered-gear-change stages, when one of the even-numbered-gear-change gear transmission mechanism and the odd-numbered-gear-change gear transmission mechanism assumes the neutral state during the changeover for establishing the gear train, the method further comprises the steps of:

holding the clutches in the connection state only for the predetermined time; and thereafter disconnecting one of the clutches, thereby establishing an upper gear-change gear train.

11. The speed change control method for a twin clutch gear transmission according to claim 7, wherein during performing a shift-down operation of a speed change ratio between the even-numbered gear-change stages or between the odd-numbered-gear-change stages, when one of the even-numbered-gear-change gear transmission mechanism and the odd-numbered-gear-change gear transmission mechanism assumes the neutral state during the changeover for establishing the gear train, the method further comprises the steps of:

holding both of the clutches in the connection state only for a predetermined time, and thereafter, disconnecting one of the clutches in order to establish a lower gear-change gear train.

12. The speed change control method for a twin clutch gear transmission according to claim 7, wherein during performing a shift-up operation of a speed change ratio between the even-numbered gear-change stages or between the odd-numbered-gear-change stages, when one of the even-numbered-gear-change gear transmission mechanism and the odd-numbered-gear-change gear transmission mechanism assumes the neutral state during the changeover for establishing the gear train, the method further comprises the steps of:

holding of the clutches in the connection state only for a predetermined time; and thereafter disconnecting one of the clutches, thereby establishing an upper gear-change gear train.

13. A speed change control method for a twin clutch gear transmission for a vehicle, wherein the gear transmission includes an even-numbered-gear-change gear transmission mechanism having a first input shaft, an odd-numbered-gear-change gear transmission mechanism having a second input shaft, and a pair of clutches adapted to connect and disconnect, respectively, with the first and second input shafts, the method comprising the steps of:

selectively establishing a plurality of even-numbered gear-change gear trains in the even-numbered-gear-change gear transmission mechanism;

selectively establishing a plurality of odd-numbered gear-change gear trains the odd-numbered-gear-change gear transmission mechanism;

individually changing over disconnection and connection of power transmission between the first and second input shaft and a power source; and bringing one of the pair of clutches into a connection state and bringing the other of the pair of clutches into a disconnection state during a usual operating condition in which a speed change ratio is fixed, and during changing a speed between even-numbered gear-change stages or between odd-numbered-gear-change stages, when one of the even-numbered-gear-change gear transmission mechanism and the odd-numbered-gear-change gear transmission mechanism assumes a neutral state during the changeover for establishing the gear train, the method further comprising the step of:

changing over to the connection state from the disconnection the clutch corresponding to the gear transmission mechanism which becomes an object of the changeover for establishing the gear train out of the even-numbered-gear-change gear transmission mechanism and the odd-numbered-gear-change gear transmission mechanism state, and changing over the clutch from the disconnection state to the connection state after completing of the changeover for establishing the gear train.

14. The speed change control method for a twin clutch gear transmission for a vehicle according to claim 13, wherein when one of the even-numbered-gear-change gear transmission mechanism and the odd-numbered-gear-change gear transmission mechanism assumes the neutral state during the changeover for establishing the gear train, and the other of gear transmission mechanisms is an object of the changeover for establishing the gear train in the disconnection state, the method further comprising the step of:

setting a predetermined time during which the clutch corresponding to the other gear transmission mechanism is temporarily changed over to the connection state.

15. The speed change control method for a twin clutch gear transmission for a vehicle according to claim 14, wherein during performing a shift-down operation of a speed change ratio between the even-numbered gear-change stages or between the odd-numbered-gear-change stages, when one of the even-numbered-gear-change gear transmission mechanism and the odd-numbered-gear-change gear transmission mechanism assumes the neutral state during the changeover for establishing the gear train, the method further comprises the steps of:

holding both of the clutches in the connection state only for the predetermined time, and thereafter, disconnecting one of the clutches in order to establish a lower gear-change gear train.

16. The speed change control method for a twin clutch gear transmission for a vehicle according to claim 14, wherein during performing a shift-up operation of a speed change ratio between the even-numbered gear-change stages or between the odd-numbered-gear-change stages, when one of the even-numbered-gear-change gear transmission mechanism and the odd-numbered-gear-change gear transmission mechanism assumes the neutral state during the changeover for establishing the gear train, the method further comprises the steps of:

holding the clutches in the connection state only for the predetermined time; and thereafter disconnecting one of the clutches, thereby establishing an upper gear-change gear train.

17. The speed change control method for a twin clutch gear transmission for a vehicle according to claim 13, wherein during performing a shift-down operation of a speed change ratio between the even-numbered gear-change stages or between the odd-numbered-gear-change stages, when one of the even-numbered-gear-change gear transmission mechanism and the odd-numbered-gear-change gear transmission mechanism assumes the neutral state during the changeover for establishing the gear train, the method further comprises the steps of:

holding both of the clutches in the connection state only for a predetermined time, and thereafter, disconnecting one of the clutches in order to establish a lower gear-change gear train.

18. The speed change control method for a twin clutch gear transmission for a vehicle according to claim 13, wherein during performing a shift-up operation of a speed change ratio between the even-numbered gear-change stages or between the odd-numbered-gear-change stages, when one of the even-numbered-gear-change gear transmission mechanism and the odd-numbered-gear-change gear transmission mechanism assumes the neutral state during the changeover for establishing the gear train, the method further comprises the steps of:

holding of the clutches in the connection state only for a predetermined time; and thereafter disconnecting one of the clutches, thereby establishing an upper gear-change gear train.

* * * * *